(12) United States Patent
Isaacs

(10) Patent No.: US 11,579,929 B2
(45) Date of Patent: Feb. 14, 2023

(54) CROSS PLATFORM APPLICATION FLOW ORCHESTRATION BY TRANSMITTING THE APPLICATION FLOW INCLUDING A TRANSITION RULE TO A PLURALITY OF COMPUTATION LAYERS

(71) Applicant: salesforce.com, inc., San Francisco, CA (US)

(72) Inventor: Charles Hart Isaacs, Annapolis, MD (US)

(73) Assignee: Salesforce. Inc., San Francisco, CA (US)

( * ) Notice: Subject to any disclaimer, the term of this patent is extended or adjusted under 35 U.S.C. 154(b) by 10 days.

(21) Appl. No.: 16/803,424

(22) Filed: Feb. 27, 2020

(65) Prior Publication Data

US 2021/0240535 A1 Aug. 5, 2021

Related U.S. Application Data

(60) Provisional application No. 62/968,412, filed on Jan. 31, 2020.

(51) Int. Cl.
*G06F 9/50* (2006.01)

(52) U.S. Cl.
CPC .... *G06F 9/5027* (2013.01); *G06F 2209/5013* (2013.01)

(58) Field of Classification Search
CPC .. G06F 9/5027; G06F 2209/5013; G06F 9/54; G06F 9/50
See application file for complete search history.

(56) References Cited

U.S. PATENT DOCUMENTS

| 10,862,774 | B2 * | 12/2020 | Palamari | H04L 41/16 |
| 2020/0034765 | A1 * | 1/2020 | Gupta | G06F 3/0486 |
| 2020/0320397 | A1 * | 10/2020 | Liu | G06F 9/4856 |
| 2020/0379805 | A1 * | 12/2020 | Porter | G06F 9/5088 |
| 2021/0097641 | A1 * | 4/2021 | Iyer | G06F 9/5072 |
| 2021/0182253 | A1 * | 6/2021 | Quesnelle | G06F 16/2379 |

* cited by examiner

*Primary Examiner* — Meng Ai T An
*Assistant Examiner* — Hsing Chun Lin
(74) *Attorney, Agent, or Firm* — Sterne, Kessler, Goldstein & Fox P.L.L.C.

(57) ABSTRACT

Disclosed herein are system, method, and computer program product embodiments for configuring a dynamic reassignment of an application flow across different computation layers based on various conditions. An embodiment operates by assigning a first rule of an application flow to a first computation layer of a plurality of computation layers. The embodiment assigns a second rule of the application flow to a second computation layer of the plurality of computation layers. The embodiment assigns a transition rule of the application flow to the first computation layer. The transition rule includes an action that causes the first rule of the application flow to be executed in the second computation layer of the plurality of computation layers based on a condition. The embodiment then transmits the application flow to the plurality of computation layers thereby causing the application flow to be configured for execution.

17 Claims, 5 Drawing Sheets

CROSS PLATFORM APPLICATION FLOW ORCHESTRATION BY TRANSMITTING THE APPLICATION FLOW INCLUDING A TRANSITION RULE TO A PLURALITY OF COMPUTATION LAYERS

CROSS-REFERENCE TO RELATED APPLICATION

The present application claims the benefit of provisional U.S. Patent Application No. 62/968,412, titled "Cross Platform Application Flow Orchestration" and filed on Jan. 31, 2020, which is incorporated herein by reference in its entirety.

BACKGROUND

Application flows (e.g., software application processes) are increasingly being executed across various computation layers. For example, a first portion of an application flow may be executed on an edge device, a second portion may be executed on a first cloud computing platform, and a third portion may be executed on a second cloud computing platform. But as edge devices gain increased compute power, there is an incentive to execute more portions of the application flow on these edge devices. This is because this reduces computation on the other shared computation layers. This allows these computation layers to support the execution of more application flows from other users. Moreover, this reduces application flow downtime due to faults at the other computation layers and or network connectivity issues.

But traditionally, portions of an application flow are statically assigned to edge devices and computation layers. This prevents the reassignment of the portions of the application flow to different edge devices and computation layers. Moreover, traditional approaches do not provide a way to reassign the portions of the application flow to different edge devices and computation layers based on user specified conditions (e.g., business conditions) and or system level conditions (e.g., central processing unit (CPU) usage) at the edge devices and computation layers. These technological problems can cause a poor experience for users of the application flow (e.g., application flow downtime and or delayed results from the application flow).

Moreover, traditional approaches do not provide a way for users to easily perform assignment (and configure reassignment conditions) of the portions of the application flow to different edge devices and computation layers. Thus, traditional approaches are often tedious, error prone, and result in an incorrect or inappropriate assignment of the portions of the application flow to different edge devices and computation layers.

Lastly, traditional approaches do not provide a way for users to get relevant reporting data about how the edge devices and computation layers are handling the execution of the application flow. As a result, users are often unable to quickly mitigate issues causing downtime of the application flow.

Thus, what is needed is a way for users to quickly create an assignment of the portions of the application flow to different computation layers that is dynamically adjusted based on user specified conditions and or system level conditions at the computation layers.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for establishing an assignment of portions of an application flow (e.g., software application process) to different computation layers that is dynamically adjusted based on user specified conditions and or system level conditions at the computation layers.

Figure 1:
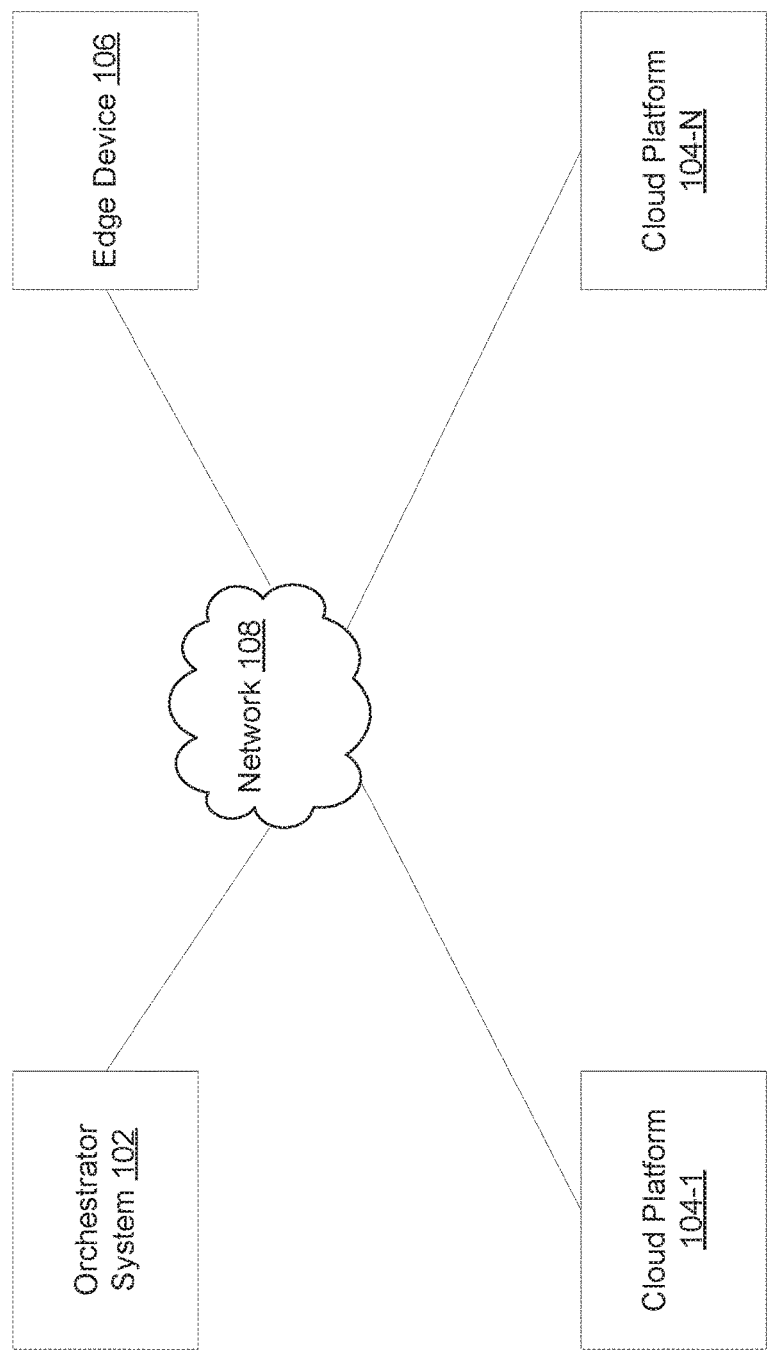
FIG. 1 is a block diagram of an environment for establishing an assignment of portions of an application flow to different computation layers that is dynamically adjusted based on various conditions, according to some embodiments.

FIG. 1 is a block diagram of an environment 100 for establishing an assignment of portions of an application flow to different computation layers that is dynamically adjusted based on various conditions, according to some embodiments. Environment 100 includes a set of computation layers; orchestrator system 102, cloud platforms 104-1 to 104-N, and edge device 106. Orchestrator system 102, cloud platforms 104-1 to 104-N, and edge device 106 are communicatively coupled together through network 108. Network 108 can include, without limitation, wired and/or wireless intranet, extranet, Internet, cellular, Bluetooth and/or any other local, short range, ad hoc, regional, global communications network, as well as any combination thereof. As would be appreciated by a person of ordinary skill in the art, there may be various numbers of computation layers of various types.

A computation layer can be a set of computing resources that execute a portion of the application flow (also referred to as a software application process). For example, a computation layer can be a cloud computing platform, server, edge device, or any other set of computing resources that execute a portion of the application flow as would be appreciated by a person of ordinary skill in the art.

The application flow can be any type of process. For example, the application flow can be a business process. The application flow can include one or more rules that can be executed at different computation layers (e.g., orchestrator system 102, cloud platforms 104-1 to 104-N, and edge device 106).

A rule can be a computation unit of an application flow. A rule can be executed on a computation layer. For example, a rule can be executed on an operating system of a computation layer. The operating system can be Microsoft Windows®, Apple iOS®, Google Android®, UNIX®, Linux, or various other types of operating system as would be appreciated by a person of ordinary skill in the art.

A rule can include one or more actions. An action can be any executable task associated with the application flow. For example, an action can perform a system level function. An action can also perform a user specified action such as creating a purchase order. An action can perform various other types of tasks as would be appreciated by a person of ordinary skill in the art.

A rule can include one or more conditions. An action can be performed when a condition occurs. A condition can be a system level condition associated with a computation layer. A condition can also be a user specified condition associated with an application flow.

An action can be based on one or more fields. A condition can also be based on one or more fields. A field can represent a value available at a computation layer. For example, a field can represent a system level value available at a computation layer. For example, a field can represent the current central processing unit (CPU) usage at a computation layer.

A field can also represent a user specified value available at a computation layer. For example, a field can represent an order quantity for a purchase order. As would be appreciated by a person of ordinary skill in the art, a field can represent various other types of system level and user specified values.

Some rules can be executable only at certain computation layers. This is because certain fields may be specific to certain computation layers. For example, a rule using a field representing a temperature of a cargo container may only be executable at a cargo container computation layer. A computation layer (e.g., cloud platforms 104 and edge device 106) can transmit fields available at its layer to orchestrator system 102.

Orchestrator system 102 can create an application flow. Orchestrator system 102 can also coordinate the assignment of rules of the application flow (e.g., portions of the application flow) to the different computation layers (e.g., cloud platforms 104 and edge device 106) for execution. Orchestrator system 102 can also assign rules of the application flow to itself for execution. Thus, orchestrator system 102 can be a computation layer that coordinates the execution of the application flow at other computation layers and/or executes the application flow itself.

A user at orchestrator system 102 can create an application flow that has one or more rules. The user at orchestrator system 102 can create a rule based on the fields available at the different computation layers. The user at orchestrator system 102 can configure the rule to perform one or more actions associated with the application flow. The user can further configure the rule to perform the one or more actions based on one or more conditions associated with application flow. After creating the one or more rules of the application flow, the user can use orchestrator system 102 to assign the rules of the application flow to the different computation layers. Orchestrator system 102 can transmit the rules over network 108 to their assigned computation layers.

Figure 2:
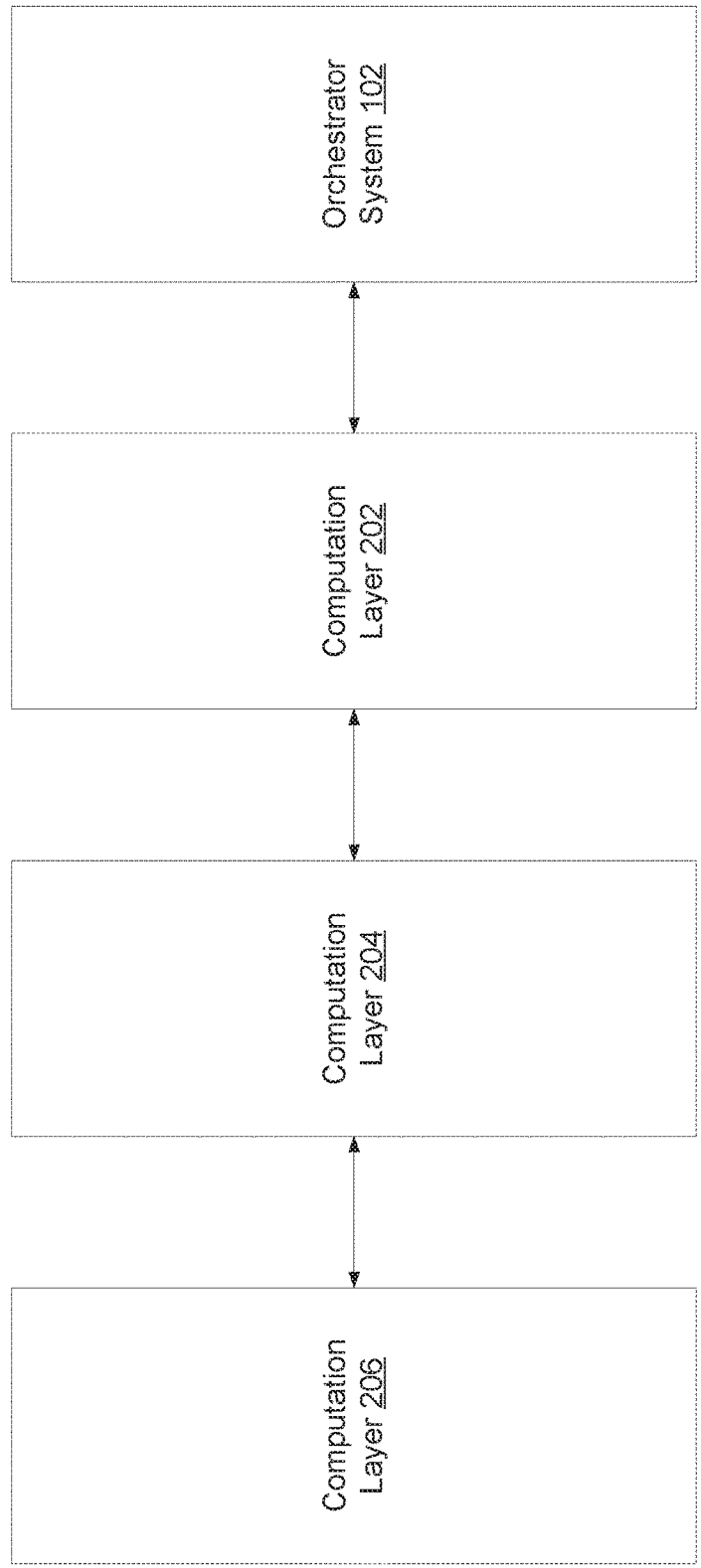
FIG. 2 is a block diagram of a set of computation layers available for dynamic reassignment of portions of an application flow, according to some embodiments.

FIG. 2 is a block diagram of a set of computation layers 200 available for dynamic reassignment of portions of an application flow, according to some embodiments. FIG. 2 is described with reference to FIG. 1. Computation layers 200 include the following computation layers: orchestrator system 102, computation layer 202, computation layer 204, and computation layer 206. Computation layer 202 can correspond to a cloud platform 104. Computation layer 204 can correspond to another cloud platform 104. Computation layer 206 can correspond to edge device 106.

A user can use orchestrator system 102 to assign rules of an application flow to the set of computation layers 200. For example, the user can use orchestrator system 102 to assign rules associated with device hardware and activity to computation layer 206 (e.g., edge device 106). The user can use orchestrator system 102 to assign rules associated with connectivity to computation layer 204 (e.g., a cloud platform 104). The user can use orchestrator system 102 to assign rules associated with device management to computation layer 202 (e.g., a cloud platform 104). As would be appreciated by a person of ordinary skill in the art, a user may want to assign more rules to edges device (e.g., computation layer 206) as they gain increased compute power. This is because this assignment can reduce the amount of network traffic occurring between the computation layers 200. In addition, this assignment can reduce computation and memory usage at the other computation layers that are shared by multiple users (e.g., computation layers 204 and 202).

After assignment, orchestrator system 102 can transmit the rules to their corresponding computation layers in computation layers 200. For example, orchestrator system 102 can connect to an endpoint associated with a computation layer in computation layers 200. Orchestrator system 102 can then transmit the rules to the endpoint. Orchestrator system 102 can transmit the rules to the endpoint using various security protocols including, but not limited to, Transport Layer Security (TLS) and Secure Sockets Layer (SSL).

Orchestrator system 102 can transmit the rules to the endpoint in an Extensible Markup Language (XML) based format. Orchestrator system 102 can also transmit the rules to the endpoint in a JavaScript Object Notation (JSON) based format. Orchestrator system 102 can transmit the rules to the endpoint using various other formats as would appreciated by a person of ordinary skill in the art. Orchestrator system 102 can further compress the rules using various compression formats as would be appreciated by a person of ordinary skill in the art.

After orchestrator system 102 transmits the rules to their corresponding computation layers, computation layers 200 can execute the rules thereby performing the application flow. For example, a computation layer in computation layers 200 can execute an action of a rule assigned to it based on the action's associated condition.

Traditional approaches for distributing an application flow across multiple computation layers can involve statically assigning rules of the application flow to different computation layers. But this can prevent the reassignment of the rules of the application flow to different computation layers. Moreover, traditional approaches do not provide a way to reassign the rules of the application flow to different computation layers based on user specified conditions (e.g., business conditions) and or system level conditions (e.g., CPU usage) at the computation layers. Finally, traditional approaches do not provide an easy way to perform assignment and or dynamic reassignment of the rules of the application flow to different computation layers.

To solve these technological problems, embodiments herein involve creating transition rules that are a part of the application flow that dynamically reallocate the execution of rules of the application flow across the different computation layers based on various conditions. For example, a transition rule may cause a rule of the application flow that is assigned to computation layer 206 to be executed in computation layer 204 in response to CPU usage at computation layer 206 being above a threshold value. The transition rules can be processed at the computation layers the same way as other rules of the application flow.

Moreover, embodiments herein provide a single environment (e.g., orchestrator system 102) for users to configure and deploy the application flow across the different computation layers. For example, the environment can provide a graphical user interface (GUI) that displays a plurality of layout segments corresponding to the different computation layers. A user can easily assign a rule of the application flow to a computation layer by inserting the rule into the corresponding layout segment. In response, the environment (e.g., orchestrator system 102) can transmit the rule to corresponding computation layer.

Figure 3:
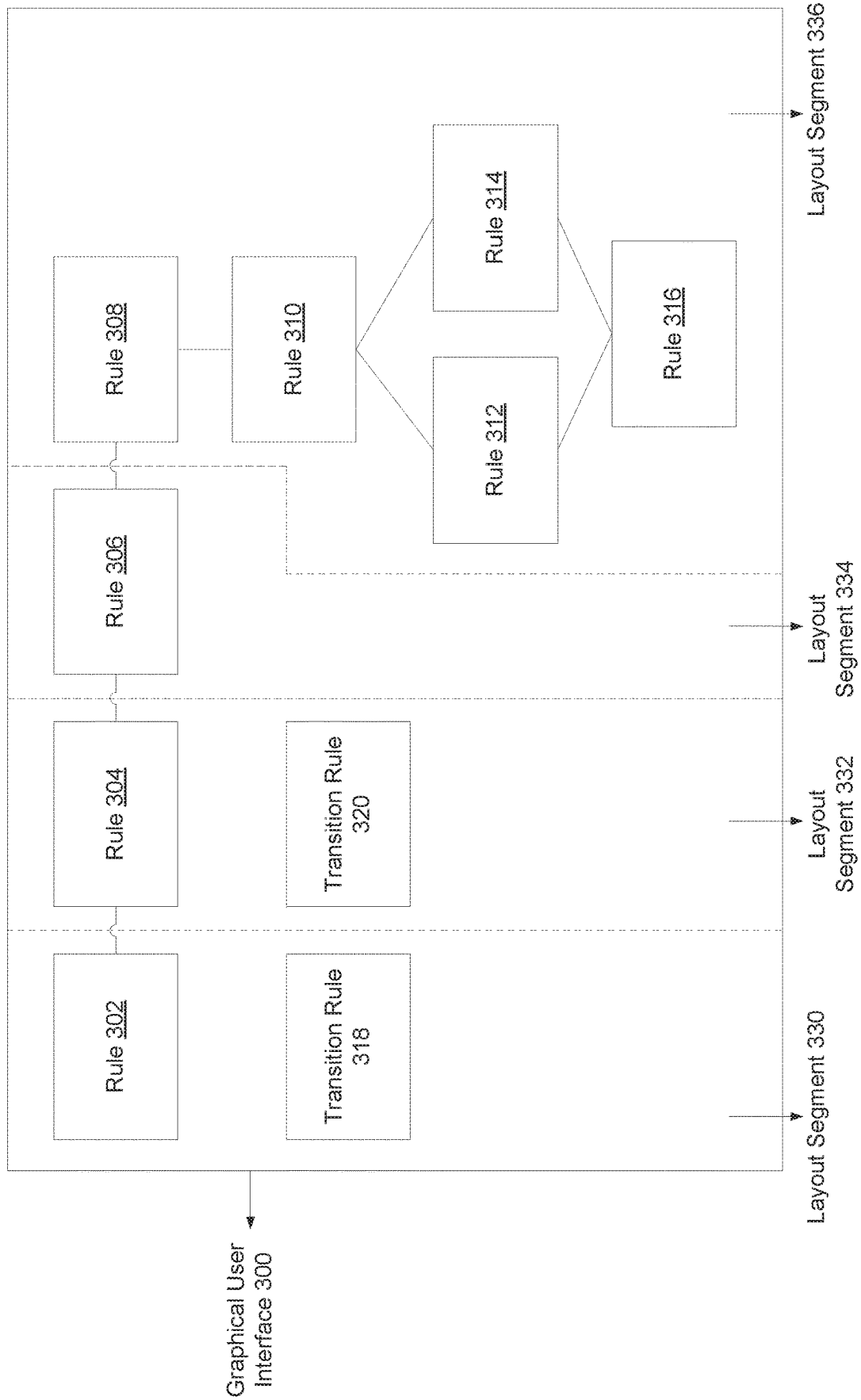
FIG. 3 illustrates an example graphical user interface at an orchestrator system that allows a user to configure a dynamic reassignment of an application flow across different computation layers based on various conditions, according to some embodiments.

FIG. 3 illustrates an example graphical user interface (GUI) 300 at orchestrator system 102 that allows a user to configure a dynamic reassignment of an application flow across different computation layers based on various conditions, according to some embodiments. FIG. 3 is discussed with respect to FIGS. 1 and 2. While FIG. 3 illustrates the use of a GUI for configuring a dynamic reassignment of an application flow across different computation layers based on various conditions, as would be appreciated by a person of ordinary skill in the art, a user at orchestrator system 102 can perform this configuration without using a GUI such as GUI 300.

GUI 300 illustrates an example application flow that includes rules 302, 304, 306, 308, 310, 312, 314, 316, and transition rules 318 and 320. The example application flow can be a business process that collects data and performs some action in orchestrator system 102 or an external system.

An application flow can perform its process by executing its associated rules in an order. For example, the example application flow in FIG. 3 can perform its process by executing in order the following rules: rules 302, 304, 306, and 308. After executing rule 308, the example application flow can execute rule 310. Rule 310 can determine the presence of an associated condition (e.g., a system level condition or a user specified condition). If the condition is present, rule 312 can be executed. If the condition is not present, rule 314 can be executed. Finally, the example application flow can execute rule 316.

Some rules can only execute on a specific computation layer. For example, a rule can check the temperature of a cargo container. If the temperature is above a threshold value, the rule can send an email to a user so that they can check the contents of the container. But this rule may only be executable on the computation layer associated with the cargo container. This is because the associated temperature field may only be available on the computation layer associated with the cargo container. Other rules, however, may be executable on multiple computation layers. For these rules, a user may want to dynamically reassign these rules to different computation layers based on various conditions (e.g., system level and or user specified conditions).

To solve this technological problem, a user at orchestrator system 102 can create transition rules that are a part of the application flow that dynamically reallocate the execution of other rules of the application flow across the different computation layers based on various conditions. Orchestrator system 102 can assign a transition rule to a computation layer like any other rule. Orchestrator system 102 can transmit the transition rule to its assigned computation layer in an XML based format, JSON based format, or various other formats as would be appreciated by a person of ordinary skill in the art. Orchestrator system 102 can further compress the transition rule using various compression formats as would be appreciated by a person of ordinary skill in the art.

Once transmitted to its assigned computation layer, the transition rule can be executed at the computation layer the same way as another rule of the application flow. The computation layer can execute an action of the transition rule that causes the reassignment of one or more rules of the application flow previously executed on the computation layer to another computation layer. The action of the transition rule can cause the reassignment of the one or more rules through orchestrator system 102. Having the transition rule cause the reassignment to occur through orchestrator system 102 can reduce the security risk of associated with dynamically changing what computation layers are executing what rules.

The action of the transition rule can cause the reassignment of the one or more rules to a computation layer closer to orchestrator system 102 (e.g., at a cloud platform such as computation layer 202). The action of the transition rule can also cause the reassignment of the one or more rules to a computation layer farther away from orchestrator system 102 (e.g., at an edge device such as computation layer 206). This creation and assignment of transition rules to computation layers can provide an easy way for a user to establish a dynamic reassignment of one or more rules of an application flow.

By way of example, and not limitation, the application flow in FIG. 3 includes two transition rules: transition rule 318 and transition rule 320. Transition rule 318 can be assigned to a first computation layer (e.g., computation layer 206). Transition rule 318 can include an action that causes rule 302 of the application flow executing at the first computation layer to be executed on a second computation layer (e.g., computation layer 204) based on a condition. When the first computation layer executes transition rule 318, the first computation layer causes rule 302 of the application flow previously executing on it to be executed on the second computation layer.

The action of transition rule 318 can transmit a reassignment request to orchestrator system 102 based on the presence of a condition associated with transition rule 318 to cause the reassignment of rule 302 to the second computation layer. For example, the condition can be that the CPU usage at the first computation layer is above a threshold value.

The reassignment request can specify that rule 302 is to be executed on the second computation layer. In response, orchestrator system 102 can cause the second computation layer to execute rule 302. In some embodiments, orchestrator system 102 can transmit rule 302 to the second computation layer for execution in response to receiving the reassignment request. In some other embodiments, orchestrator system 102 can transmit rule 302 to the second computation layer prior to receiving the reassignment request. After receiving the reassignment request, orchestrator system 102 can then transmit a request to the second computation layer to execute the previously loaded rule 302.

Similarly, in FIG. 3, transition rule 320 can be assigned to a first computation layer (e.g., computation layer 204 corresponding to layout segment 332). Transition rule 320 can include an action that causes rule 304 of the application flow executing at the first computation layer to be executed on a second computation layer (e.g., computation layer 202 corresponding to layout segment 334) based on a condition. When the first computation layer executes transition rule 320, the first computation layer causes rule 304 of the application flow previously executing on it to be executed on the second computation layer.

The action of transition rule 320 can transmit a reassignment request to orchestrator system 102 based on the presence of a condition associated with transition rule 320 to cause the reassignment of rule 304 to the second computation layer. For example, the condition can be that the memory usage at the first computation layer is above a threshold value.

A user at orchestrator system 102 can specify one or more conditions for when an action of a transition rule is executed. This can ensure that a transition rule causes one or more rules of an application flow executing at a first computation layer to be executed on a second computation layer under the appropriate circumstances. But the circumstances for when to execute an action of a transition rule often change over time. Thus, the original conditions specified by the user for executing a transition rule may no longer be appropriate.

To solve this technological problem, in some embodiments, orchestrator system 102 can determine an execution state of the application flow based on machine learning. For example, orchestrator system 102 can use machine learning to determine that rules of the application flow are executed at a specific computation layer much more often on specific days and at specific times. The execution state of the application flow can represent a state of a computation layer or a state of the application flow. As would be appreciated by a person of ordinary skill in the art, the execution state of the application flow can represent various other types of states.

In response to determining an execution state of an application flow, orchestrator system 102 can modify one or more transition rules of the application flow. For example, orchestrator system 102 can change one or more conditions for when an action of a transition rule is executed. Orchestrator system 102 can also add or remove one or more conditions for when an action of a transition rule is executed. In response to modifying the one or more transition rules of the application flow, orchestrator system 102 can transmit the modified transition rules to their assigned computation layers.

In some embodiments, in response to determining an execution state of an application flow, orchestrator system 102 can generate one or more new transition rules for the application flow. Orchestrator system 102 can then assign the one or more new transition rules to the appropriate computation layers. Orchestrator system 102 can then transmit the new transition rules to their assigned computation layers.

A user at orchestrator system 102 can create transition rules that are a part of the application flow that dynamically reallocate the execution of other rules of the application flow across the different computation layers based on various conditions. But this is often insufficient to ensure a good user experience. This is because the dynamic reallocation of rules across the different computation layers does not always solve application flow downtime or reduce the delay in results from the application flow. For example, a network connectivity issue (e.g., a switch from a high bandwidth connection to a low bandwidth connection) may not be overcome by merely reallocating the rules of the application flow across the different computation layers. Rather, in this circumstance, a user at orchestrator system 102 may want reporting data about the network connectivity issue. Thus, the user at orchestrator system 102 often wants telemetry data about the operation of one or more computation layers.

To solve this technological problem, in some embodiments, a user at orchestrator system 102 can add a reporting action to a transition rule of an application flow. When a computation layer executes the transition rule, the reporting action can collect telemetry data for the computation layer. The telemetry data can include various measurements or other types of data for the computation layer. For example, the telemetry data can include an execution state (e.g., CPU usage, memory usage, network utilization, etc.) of the application flow at the computation layer. The reporting action can transmit the collected telemetry data to orchestrator system 102 for analysis by the user. The user can then take mitigatory actions based on the collected telemetry data. Because the reporting action is added to the transition rule, the reporting action can always collect accurate telemetry data at a computation layer even when rules of the application flow assigned to that computation layer are dynamically reassigned to other computation layers. Moreover, because the reporting action is directly added to the transition rule, the reporting action can be processed in the same way as any other action of a rule of the application flow.

A user at orchestrator system 102 can assign rules (e.g., normal rules or transition rules) of an application flow to different computation layers. While transition rules can dynamically reallocate the execution of other rules of the application flow across the different computation layers, the user may still initially assign the rules of the application flow to specific computation layers. Traditional approaches for assigning rules of an application flow to specific computation layers are often tedious, error prone, and result in an incorrect or inappropriate assignment of the rules to the different computation layers. This is because these traditional approaches do not provide an easy way for the user to perform the rule assignment.

To solve this technological problem, in some embodiments, and as illustrated in FIG. 3, orchestrator system 102 can configure example GUI 300 to allow a user to easily and visually assign rules to specific computation layers. Example GUI 300 includes layout segments 330, 332, 334, and 336. A layout segment can represent a computation layer (e.g., computation layers 202, 204, 206, and orchestrator system 102). Orchestrator system 102 can configure GUI 300 to allow insertion of a rule of an application flow (e.g., a regular rule or a transition rule) into a layout segment (e.g., layout segments 330, 332, 334, and 336) by an input gesture. For example, the user, using a computer mouse, can drag and drop a visual representation of rule 302 into layout segment 330 representing computation layer 206.

In some embodiments, in response to determining that the visual representation of rule 302 is in layout segment 330, orchestrator system 102 can determine whether rule 302 can be executed in computation layer 206. For example, orchestrator system 102 can determine whether the one or more fields associated with rule 302 are available at computation layer 206. If yes, orchestrator system 102 can proceed with assigning rule 302 to computation layer 206. If not, orchestrator system 102 can prevent the assignment of rule 302 to computation layer 206. Orchestrator system 102 can also alert the user that rule 302 cannot be assigned to computation layer 206.

Figure 4:
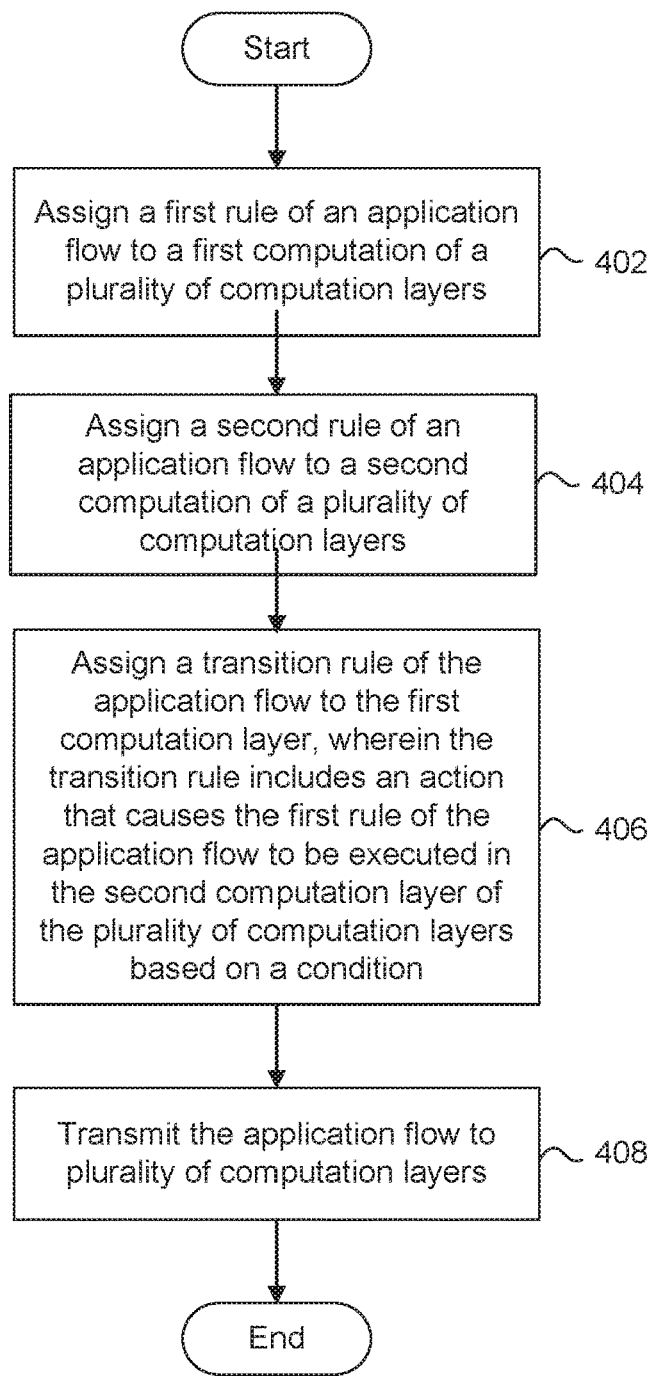
FIG. 4 is a flowchart illustrating a process for configuring a dynamic reassignment of an application flow across different computation layers based on various conditions, according to some embodiments.

FIG. 4 is a flowchart for a method 400 for configuring a dynamic reassignment of an application flow across different computation layers based on various conditions, according to an embodiment. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1-3. However, method 400 is not limited to those example embodiments.

In 402, orchestrator system 102 assigns a first rule of an application flow to a first computation layer of a plurality of computation layers. In some embodiments, orchestrator system 102 can configure a GUI (e.g., GUI 300) to allow a user to easily and visually assign the first rule to a specific computation layer. The GUI can include one or more layout segments. A layout segment can represent a computation layer (e.g., computation layers 202, 204, 206, and orchestrator system 102). Orchestrator system 102 can configure the GUI to allow insertion of a visual representation of the first rule of the application flow into a layout segment representing the first computation layer by an input gesture. For example, the user, using a computer mouse, can drag and drop the visual representation of the first rule into the layout segment representing the first computation layer. After receiving the visual representation of the first rule via the input gesture, orchestrator system 102 can determine that the visual representation of the first rule is in the layout segment.

In some embodiments, in response to determining that the visual representation of the first rule is in the layout segment representing the first computation layer, orchestrator system 102 can determine whether the first rule can be executed in the first computation layer. If yes, orchestrator system 102 can proceed with assigning the first rule to the first computation layer. If not, orchestrator system 102 can prevent the assignment of the first rule to the first computation layer. Orchestrator system 102 can also alert the user that the first rule cannot be assigned to the first computation layer.

In 404, orchestrator system 102 assigns a second rule of the application flow to a second computation layer of the plurality of computation layers. As would be appreciated by a person of ordinary skill in the art, orchestrator system 102 can allow the user to easily and visually assign the second rule of the application flow to the second computation layer in the same manner as in 402.

In 406, orchestrator system 102 assigns a transition rule of the application flow to the first computation layer. As would be appreciated by a person of ordinary skill in the art, orchestrator system 102 can allow the user to easily and visually assign the transition rule of the application flow to the first computation layer in the same manner as in 402 and 404.

In some embodiments, the transition rule can include an action that causes the first rule of the application flow to be executed in the second computation layer of the plurality of computation layers based on a condition. The condition can be, but is not limited to, a system level condition or a user specified condition associated with the application flow.

The action of the transition rule can transmit a reassignment request to orchestrator system 102 based on the presence of the condition to cause the reassignment of the first rule to the second computation layer. The reassignment request can specify that the first rule is to be executed on the second computation layer. In response, orchestrator system 102 can cause the second computation layer to execute the first rule.

In some embodiments, orchestrator system 102 can transmit the first rule to the second computation layer for execution in response to receiving the reassignment request. In some other embodiments, orchestrator system 102 can transmit the first rule to the second computation layer prior to receiving the reassignment request. After receiving the reassignment request, orchestrator system 102 can then transmit a request to the second computation layer to execute the previously loaded first rule.

In some embodiments, the user at orchestrator system 102 can add a reporting action to the transition rule of the application flow. When the first computation layer executes the transition rule, the reporting action can collect telemetry data for the first computation layer. The telemetry data can include various measurements or other types of data for the first computation layer. The reporting action can transmit the collected telemetry data to orchestrator system 102 for analysis by the user. The user can then take mitigatory actions based on the collected telemetry data.

In 408, orchestrator system 102 transmits the application flow to plurality of computation layers. The transmitting causes the application flow to be configured for execution across the plurality of computation layers. Orchestrator system 102 can transmit the first rule and the transition rule to the first computation layer over network 108. Orchestrator system 102 can further transmit the second rule to the second computation layer over network 108.

Figure 5:
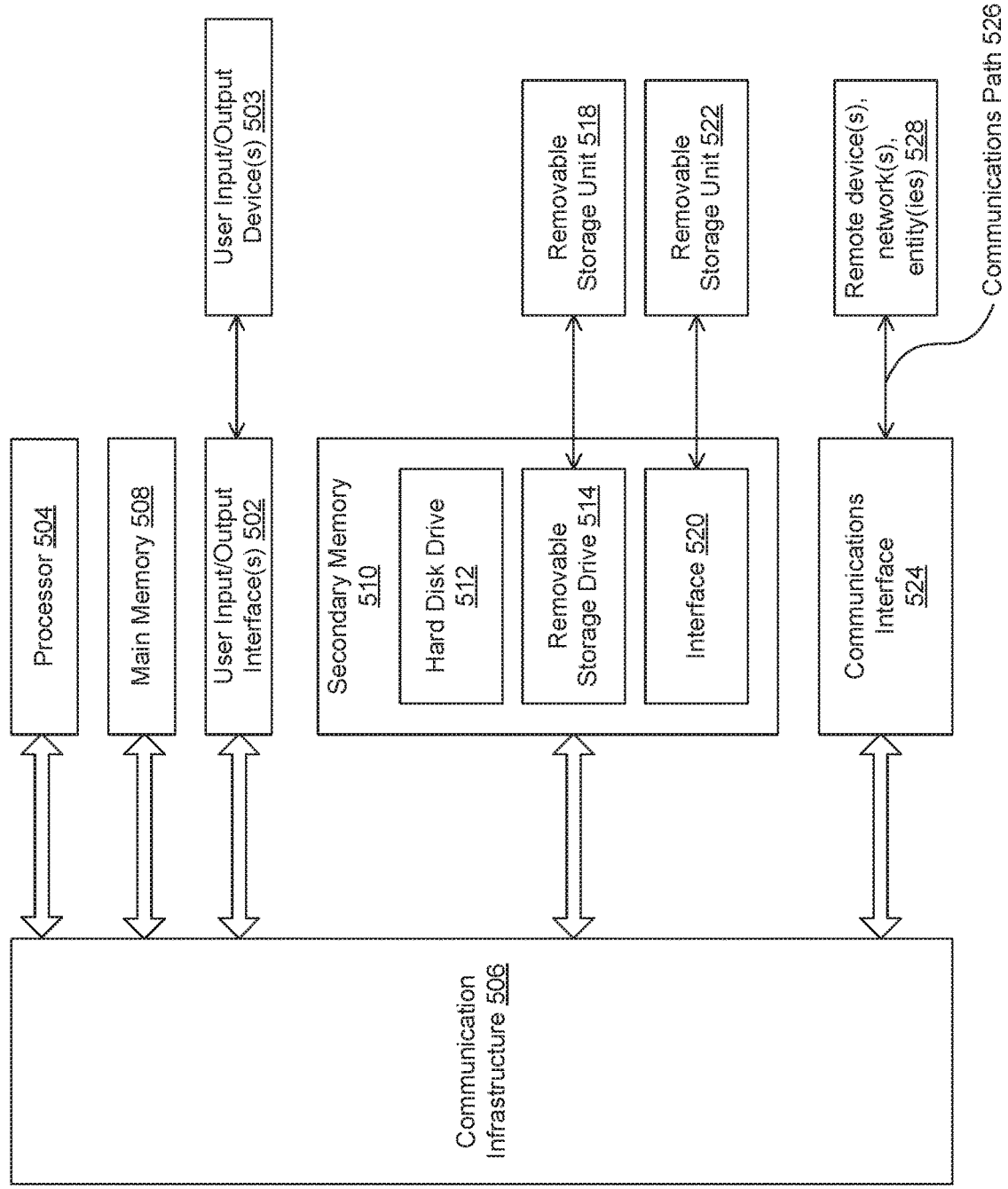
FIG. 5 is an example computer system useful for implementing various embodiments.

Various embodiments can be implemented, for example, using one or more computer systems, such as computer system 500 shown in FIG. 5. Computer system 500 can be used, for example, to implement method 400 of FIG. 4. For example, computer system 500 can configure a dynamic reassignment of an application flow across different computation layers based on various conditions. Computer system 500 can be any computer capable of performing the functions described herein.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data.

Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment." "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:

first assigning, by at least one processor, a first rule of an application flow to a first computation layer of a plurality of computation layers, the first computation layer being carried out by an edge device, wherein the application flow is a software application process, the first rule comprises a first action configured to execute upon an occurrence of a first condition, and the first action is a first executable task associated with the application flow;

second assigning, by the at least one processor, a second rule of the application flow to a second computation layer of the plurality of computation layers, the second computation layer being carried out by a cloud computing platform, the second rule comprising a second action configured to execute upon an occurrence of a second condition, wherein the second action is a second executable task associated with the application flow;

third assigning, by the at least one processor, a transition rule of the application flow to the first computation layer, wherein the transition rule comprises a third action that causes the first rule of the application flow to be executed in the second computation layer of the plurality of computation layers based on a third condition;

transmitting, by the at least one processor, each rule of the application flow to a respective assigned computation layer of the plurality of computation layers thereby causing the application flow to be configured for execution;
executing the transition rule in response to detecting the third condition being met, the execution of the transition rule including transmitting a reassignment request to the at least one processor; and
causing the second computation layer to execute the first rule of the application flow based on an execution state of the application flow, wherein the execution state is determined based on machine learning and describes a state of the application flow and the plurality of computational layers.

2. The method of claim 1, further comprising:
implementing, by at least one processor, a graphical user interface (GUI) comprising a plurality of layout segments corresponding to the plurality of computation layers, wherein the GUI is configured to allow insertion of a visual representation of the first rule into one of the plurality of layout segments by an input gesture; and
wherein the first assigning further comprises:
receiving, by the at least one processor, the visual representation of the first rule of the application flow via the input gesture;
determining, by the at least one processor, the visual representation of the first rule is in a layer segment of the plurality of layer segments that corresponds to the first computation layer; and
fourth assigning, by the at least one processor, the first rule to the first computation layer based on the determining.

3. The method of claim 1, wherein the third condition is a system level condition at the first computation layer or a user specified condition.

4. The method of claim 1, further comprising:
reassigning, by the at least one processor, the first rule to the second computation layer based on a performance of the third action; and
transmitting, by the at least one processor, the first rule to the second computation layer based on the reassigning.

5. The method of claim 1, further comprising:
determining, by the at least one processor, based on the execution state of the application flow that performance of the application flow can be further improved by updating the transition rule;
modifying, by the at least one processor, the transition rule based on the execution state of the application flow; and
transmitting, by the at least one processor, the modified transition rule to the first computation layer.

6. The method of claim 1, wherein the transition rule comprises a reporting action that collects telemetry data at the first computation layer.

7. A system, comprising:
a memory; and
at least one processor coupled to the memory and configured to:
first assign a first rule of an application flow to a first computation layer of a plurality of computation layers, the first computation layer being carried out by an edge device, wherein the application flow is a software application process, the first rule comprises a first action configured to execute upon an occurrence of a first condition, and the first action is a first executable task associated with the application flow;
second assign a second rule of the application flow to a second computation layer of the plurality of computation layers, the second computation layer being carried out by a cloud computing platform, the second rule comprising a second action configured to execute upon an occurrence of a second condition, wherein the second action is a second executable task associated with the application flow;
third assign a transition rule of the application flow to the first computation layer, wherein the transition rule comprises a third action that causes the first rule of the application flow to be executed in the second computation layer of the plurality of computation layers based on a third condition;
transmit each rule of the application flow to a respective assigned computation layer of the plurality of computation layers thereby causing the application flow to be configured for execution;
receive a reassignment request from the first computation layer indicating that the third condition associated with the transition rule has been met; and
reassigning and transmitting the first rule of the application flow to the second computation layer based on an execution state of the application flow, wherein the execution state is determined based on machine learning and describes a state of the application flow and the plurality of computational layers.

8. The system of claim 7, wherein the at least one processor is further configured to:
implement a graphical user interface (GUI) comprising a plurality of layout segments corresponding to the plurality of computation layers, wherein the GUI is configured to allow insertion of a visual representation of the first rule into one of the plurality of layout segments by an input gesture; and
wherein to first assign the first rule of the application flow, the at least one processor is further configured to:
receive the visual representation of the first rule of the application flow via the input gesture;
determine the visual representation of the first rule is in a layer segment of the plurality of layer segments that corresponds to the first computation layer; and
fourth assign the first rule to the first computation layer based on the determination that the visual representation of the first rule is in the layer segment of the plurality of layer segments that corresponds to the first computation layer.

9. The system of claim 7, wherein the third condition is a system level condition at the first computation layer or a user specified condition.

10. The system of claim 7, wherein the at least one processor is further configured to:
reassign the first rule to the second computation layer on a performance of the third action; and
transmit the first rule to the second computation layer based on the reassignment of the first rule to the second computation layer.

11. The system of claim 7, wherein the at least one processor is further configured to:
determine based on the execution state of the application flow that performance of the application flow can be further improved by updating the transition rule;
modify the transition rule based on the execution state of the application flow; and
transmit the modified transition rule to the first computation layer.

12. The system of claim 7, wherein the transition rule comprises a reporting action that collects telemetry data at the first computation layer.

13. A non-transitory computer-readable device having instructions stored thereon that, when executed by at least one computing device, causes the at least one computing device to perform operations comprising:
- first assigning a first rule of an application flow to a first computation layer of a plurality of computation layers, the first computation layer being an edge device, wherein the application flow is a software application process, the first rule comprises a first action configured to execute upon an occurrence of a first condition, and the first action is a first executable task associated with the application flow;
- second assigning a second rule of the application flow to a second computation layer of the plurality of computation layers, the second computation layer being a cloud computing platform, the second rule comprising a second action configured to execute upon an occurrence of a second condition, wherein the second action is a second executable task associated with the application flow;
- third assigning a transition rule of the application flow to the first computation layer, wherein the transition rule comprises a third action that causes the first rule of the application flow to be executed in the second computation layer of the plurality of computation layers based on a third condition;
- causing a transmission of each rule of the application flow to a respective assigned computation layer of the plurality of computation layers thereby causing the application flow to be configured for execution;
- executing the transition rule in response to detecting the third condition being met, the execution of the transition rule including transmitting a reassignment request to the at least one processor; and
- causing the second computation layer to execute the first rule of the application flow based on an execution state of the application flow, wherein the execution state is determined based on machine learning and describes a state of the application flow and the plurality of computational layers.

14. The non-transitory computer-readable device of claim 13, the operations further comprising:
- implementing a graphical user interface (GUI) comprising a plurality of layout segments corresponding to the plurality of computation layers, wherein the GUI is configured to allow insertion of a visual representation of the first rule into one of the plurality of layout segments by an input gesture; and
- wherein the first assigning further comprises:
  - causing a receipt of the visual representation of the first rule of the application flow via the input gesture;
  - determining the visual representation of the first rule is in a layer segment of the plurality of layer segments that corresponds to the first computation layer; and
  - fourth assigning the first rule to the first computation layer based on the determining.

15. The non-transitory computer-readable device of claim 13, wherein the third condition is a system level condition at the first computation layer or a user specified condition.

16. The non-transitory computer-readable device of claim 13, the operations further comprising:
- reassigning the first rule to the second computation layer based on a performance of the third action; and
- causing a transmission of the first rule to the second computation layer based on the reassigning.

17. The non-transitory computer-readable device of claim 13, the operations further comprising:
- determining based on the execution state of the application flow that performance of the application flow can be further improved by updating the transition rule;
- modifying the transition rule based on the execution state of the application flow; and
- causing a transmission of the modified transition rule to the first computation layer.

* * * * *